CRYSTAL CONTROLLED TRANSDUCER COUPLING CIRCUIT

Filed March 25, 1964

INVENTOR:
Harry R. Newhoff
By John B. Miller, Jr.
Agent

United States Patent Office 3,434,051

Patented Mar. 18, 1969

3,434,051

CRYSTAL CONTROLLED TRANSDUCER COUPLING CIRCUIT

Harry Robert Newhoff, Santa Susanna, Calif., assignor to Litton Systems, Inc., Beverly Hills, Calif.

Filed Mar. 25, 1964, Ser. No. 354,671

U.S. Cl. 324—60 4 Claims

Int. Cl. H03k 3/28, 3/34

ABSTRACT OF THE DISCLOSURE

Transducer coupling apparatus for generating a bilevel signal of a predetermined controlled frequency having a duty cycle that may be varied by the change in characteristics of a transducer used as a component of the coupling circuit. A piezoelectric crystal is interposed between two transistors of the coupling circuit to regulate the inter-switching frequency of the two transistors between their conducting and noncoductig states.

The preset invention relates to a circuit for coupling a resistive or a reactance-change transducer to a digital computer and, more particularly, to a circuit for generating a digital output signal with an extremely-accurate, predetermined by variations in a measured resistance or reactance value.

Many phenomena of interest may be measured if changed to electrical analog form. The change is normally accomplished by having the phenomena directly affect the motion of electrons in some sensitive element, or produce an internal change in the characteristics of a basic material, or mechanically produce a change in resistance or reactance. A device that may be so stimulated is generally termed a transducer. However, in order that a digital computer or similar device may operate in response to the electrical analog signals generated by transducers, the signals must be placed in a form recognizable by the computer.

It has been proposed that the variations in amplitude of an electrical analog signal be used to control the frequency of an oscillator output signal. One means by which this may be accomplished is by applying the amplitude-varying analog signal to a voltage-tuned oscillator (VTO). The frequency of oscillation of the circuit may be varied by changing the amplitude of the analog input signal, thus causing the output signal generated by the oscillator circuit to have a frequency proportional to the amplitude of the applied analog signal. The VTO output signal is applied to a frequency counter enabled by a system clock signal. In response to the two signals, the frequency counter generates digital output signals representing the number of cycles of the VTO output signal which are applied to the counter during a specified clock time. The digital output signal of the counter representing the measured value may then be applied directly to the digital computer.

While such means of coupling the analog signal to a digital computer have been widely used, they are plagued by serious problems which the present invention obviates. First, the voltage-tuned oscillator circuit is inherently complex. Normally, such an apparatus requires specially designed power supplies for precisely regulating the voltages applied to the circuit elements to reduce frequency drift and to keep ripple voltages in the output signal at a negligible level. Second, the VTO output signal, representing the amplitude of the analog input, is frequency modulated; that is, for a low level input signal a low frequency signal will be counted by the frequency counter, and for a high input signal a high frequency will be counted by the frequency counter. Because a precise time reference or clock signal is used to control the periods during which the counter operates, any inherent instability in the VTO will be directly reflected by the frequency counter in response to the VTO output signal.

The present inventor, recognizing these and other disadvantages of the prior art transducer-coupling circuits, has turned his attention to designating a unique coupling circuit which generates a signal of a predetermined, precisely controlled frequency having a duty cycle that may be varied by the change in characteristics of the transducer. In accordance with the basic concepts of the invention, the coupling circuit employs the inherent frequency stability of a piezoelectric crystal to precisely control the interswitching frequency of two transistors between their conducting and non-conducting states. The transducer to be coupled is interposed between a base electrode of one transistor and a voltage source, if the transducer is a resistive type. If the transducer is a reactance-change transducer, it is interposed between a base electrode of one transistor and a collector electrode of the other transistor. Two transducers may be simultaneously coupled to a computer by connecting transducers in both locations. An output signal generated by the coupling circuit (which, together with the coupled transducer may be thought of as an analog detector) has a precise, predetermined frequency; but the duty cycle (the ratio of on-time to the total cycle time) is offset from the normal 50% point by the variation in the resistance or capacitance of the transducer or transducers coupled. Large variations in the voltages supplied to the coupling circuit of the present invention have been shown to have no effect on its frequency of operation.

In one embodiment of the present invention, the analog detector output signal is gated, together with a system clock signal, to trigger a pulse counting circuit. More particularly, the analog detector output signal is used to enable an AND-gate circuit to pass pulses of the system clock signal during the on period of the duty cycle. The pulse counting circuit, in response to the AND-gate output signal, registers or produces a signal indicative of the number of system clock pulses which occur during the duty cycle of the analog detector output signal. Accordingly, because the duty cycle of the detector output signal is directly and substantially controlled by the resistance or capacitance value of the transducer only, the response of the counter is directly indicative of the change in characteristic of the transducer.

Moreover, the transducer coupling circuit may be employed to couple a transducer to a digital computer. Since the coupling circuit generates a precisely controlled frequency signal, if the frequency of operation thereof is chosen to be equal to the information acceptance rate of the digital computer in question, the coupling circuit acts to provide its own clock signal having interposed therebetween the analog-rontrolled variable information. The coupling circuit may also be employed as a precisely controlled clock-signal generator.

It is, therefore, an object of the present invention to provide a simply mechanized and unique coupling circuit adapted for interconnecting a resistance or reactance-change transducer to computing devices.

It is another object of the present invention to provide a clock signal generator whose output frequency is precisely controlled.

It is a further object of the present invention to provide apparatus for uniquely and precisely measuring capacitance or resistance of a circuit element.

It is still another object of the present invention to increase the frequency stability of free-running multivibrators.

It is yet a further object of the present invention to provide a crystal-controlled, free-running switching circuit the frequency of which is insensitive to large variations in voltage and circuit parameters.

It is a still further object of the present invention to provide a transducer-coupling circuit, the output signal of which has a precise preselected frequency and a duty cycle proportional to the transducer input.

The more important features of this invention have thus been outlined rather broadly in order that the detailed description thereof that follows may be understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may be readily utilized as a basis for designing other structures for carrying out the several purposes of the invention. It is important, therefore, that the claims to be granted herein shall be of sufficient breadth to prevent the appropriation of this invention by those skilled in the art.

The novel features which are believed to be characteristic of the invention, both as to its organization and method of operation, together with further objects and advantages thereof, will be better understood from the following description considered in connection with the accompanying drawings in which three embodiments of the invention are illustrated by way of example. It is to be expressly understood, however, that the drawings are for the purpose of illustration and description only and are not intended as a definition of the limits of the invention.

Figure 1:
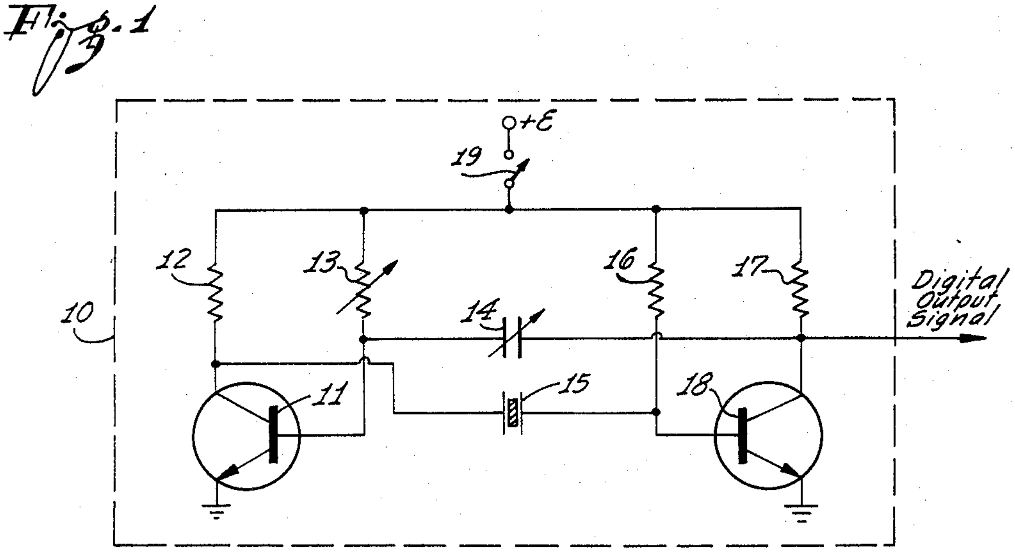
FIGURE 1 is a schematic diagram wherein is illustrated a transducer-coupling circuit constructed in accordance with the principles of the present invention.

Referring now to the drawings wherein like or corresponding parts are similarly designated throughout the several views, there is shown in FIGURE 1 a transducer-coupling circuit 10 adapted to couple a resistive or a capacitive transducer to a digital computer or similar apparatus. As illustrated in FIGURE 1, the coupling circuit 10 comprises a pair of transistors 11 and 18, each having an emitter electrode thereof biased at ground potential. A source of positive potential +E is coupled through a switch 19 to the collector electrodes of the transistors 11 and the transistor 18 through a load resistor 12 and a load resistor 17, respectively. The collector electrode of the transistor 11 is coupled to the base electrode of the transistor 18 through a piezoelectric crystal 15. A base-pullup resistor 16 interconnects the base electrode of the transistor 18 and the source of positive potential +E, through the switch 19. Similarly, the collector electrode of the transistor 18 is coupled to the base electrode of the transistor 11 through a variable capacitor 14, the base electrode of the transistor 11 also being coupled to the source of positive potential +E through the switch 19 by a second base-pullup resistor 13. For reasons which will be apparent from the description below, the resistor 13 is shown as a variable resistor.

To one skilled in the art, at first glance, the operation of the transducer coupling circuit 10 appears comparable to the operation of a transistorized free-running multivibrator. However, it should be noted that, in contrast to the operation of the astable multivibrator, substantial variations in the value of the coupling capacitor 14 or the base-pullup resistor 13 do not affect the over-all frequency of oscillation of the circuit 10. More particularly, the crystal 15 is employed at a carefully determined position in the circuit 10 to precisely fix the frequency of oscillation of the circuit 10, the values of resistor 13 and capacitor 14 determining only the duty cycle of operation. Thus, when the switch 19 is closed, initially, the positive potential +E is applied to the collector electrodes of the transistor 11 and the transistor 18. The application of this positive voltage to the collector and base electrodes of the transistors 11 and 18 tends to drive one or the other of the transistors into its saturated state of operation. The application of the positive potential +E to the collector electrode of the transistor 11, moreover, applies sufficient energy to the crystal 15 to initiate vibration at its natural frequency which depends upon the material of the crystal, the manner in which the crystal is cut, and the dimensions of the crystal.

For example, assume that the application of the positive potential +E drives the transistor 18 into its conducting state of operation. As the transistor 18 saturates, the voltage at its collector electrode will drop to a level close to zero volts. This drop at the collector electrode of the transistor 18 is reflected through the capacitor 14 at the base electrode of the transistor 11 causing it to cut off. The voltage across the capacitor 14 will begin to rise exponentially until, upon crossing the cutoff voltage level of the transistor 11, it triggers the transistor 11 into conduction. The time required for the capacitor 14 to charge to the cutoff voltage level of the transistor 11 is commonly determined by the values of the resistor 13 and the capacitor 14 expressed in terms of ohms and units of farads, respectively, multiplied together to give the time constant of the circuit.

When the transistor 11 is driven into saturation, the potential at the collector electrode of the transistor 11 is effectively reduced to zero volts. The potential at the base electrode of the transistor 18 drops instantaneously, turning off the transistor 18. After a time substantially equal to one half its natural period of oscillation, the crystal 15 furnishes a pulse of electrical energy which is applied to the base electrode of the transistor 18, driving it again into saturation.

Analogies may be drawn between various mechanical properties of the crystal 15 and electrical characteristics of a tuned circuit. The crystal itself is substantially equivalent to a series-resonant circuit comprising a resistor R, a capacitor C, and an inductor L. The electrodes which are coupled to the crystal have an inherent capacitance $C_e$ that is commonly considered to be in parallel with the series-resonant circuit. Known to those skilled in the art as the equivalent circuit of a crystal, this series-parallel arrangement has a parallel-resonant frequency determined by the inductance value of the inductor L and the equivalent capacitance value of the series capacitor C and the electrode capacitor $C_e$ in series. At the parallel-resonant frequency, the reactance of the series-parallel arrangement passes through a maximum, while the resistance remains constant, just as in any tuned circuit. Thus, an extremely high Q (the ratio of the reactance of the inductor and the capacitors at resonant frequency divided by the resistance in the circuit), ranging from 5 to 10 times the Q's obtainable with good LC circuits, is obtained from the crystal. The crystal 15 provides, effectively, then a tuned circuit which rings to control the oscillation frequency of the circuit 10. The crystal 15 singularly controls the time when the transistor 18 is driven into conduction, the values of the resistor 13 and the capacitor 14 determining only the length of time that the transistor 18 remains in that state.

It is thus apparent that in place of the resistor 13 a resistive transducer may be substituted whose resistance value varies in response to temperature, mechanical strain, or other physical stimulation. Alternatively, a reactance-change transducer of the capacitive type may be substituted for the capacitor 14. These changes are illustrated in the drawings by showing the elements as variable. The analog signals determined by the value of the resistor 13 (or a substituted transducer) determine the duty cycle of the output signals but do not vary the overall frequency of the digital output signal generated by the circuit 10. It follows then, that the digital output signal of the circuit 10 may be directly applied to a computer responsive to signals of a frequency equal to the frequency of a crystal 15 without the use of other circuitry. Such signals provide an accurate clock containing an analog-indicative, time-modulated duty cycle.

Figure 2:
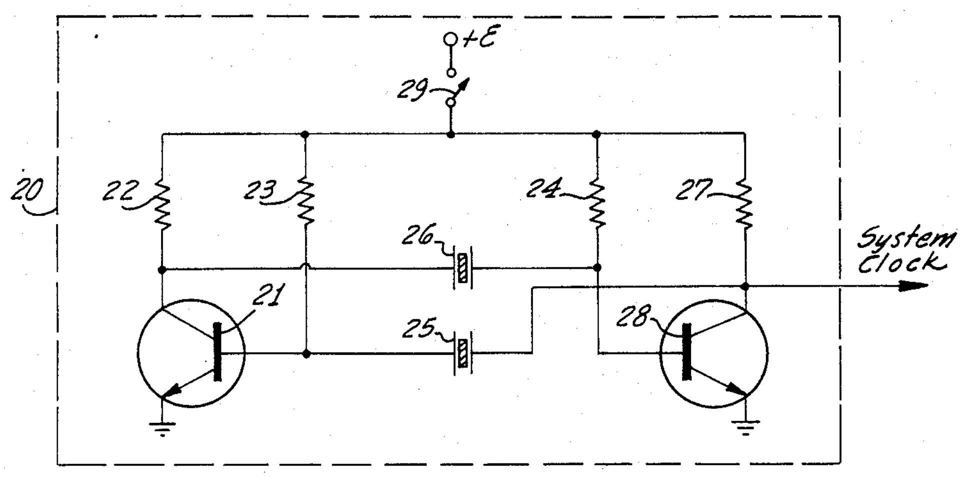
FIGURE 2 is a schematic diagram wherein is illustrated a clock signal generator constructed in accordance with the principles of the present invention.

Referring now to FIGURE 2, there is shown a clock-signal generator circuit 20 similar to the circuit described hereinabove. It will be noted that the clock-signal generator circuit 20 also comprises a pair of transistors 21 and 28, having their emitter electrodes connected to ground and their collector electrodes coupled to a source of positive potential +E through a pair of resistors 22 and 27, respectively, and a switch 29. A base pull-up resistor 23 couples the base electrode of the transistor 21 to the source of positive potential +E, and a base pull-up resistor 24 couples the base electrode of the transistor 28 to the source of positive potential +E. A piezoelectric crystal 26 couples the base electrode of the transistor 28 to the collector electrode of the transistor 21. In contrast to circuit 10, however, a crystal 25 intercouples the collector electrode of the second transistor 28 to the base electrode of the transistor 21.

The output signal of the clock-signal generator circuit 20 will be precisely symmetric if the resonant frequency of the crystal 25 equals the resonant frequency of the crystal 26. Accordingly, a perfectly symmetrical and unquestionable clock-signal is produced by the circuit 20, the crystals 25 and 26 controlling "turn-on" time of the transistors 21 and 28, respectively, in a similar manner as did the crystal 15 with respect to the transistor 18 of the circuit 10 described above.

Figure 3:
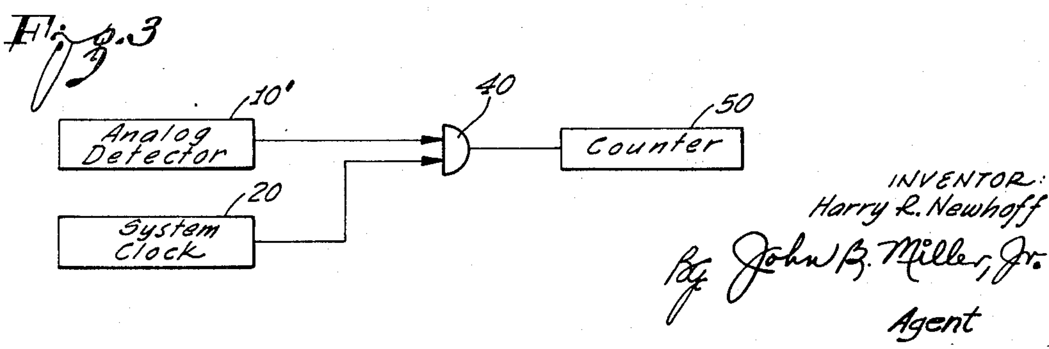
FIGURE 3 is a block diagram illustrating one embodiment of a capacitance and resistance measuring device constructed in accordance with the principles of the present invention.

Reefrence is now made to FIGURE 3 wherein is shown one application of the two above described circuits for measuring physical stimuli by a capacitive or resistive transducer. More particularly, a reactance-change transducer (capacitance type) or resistive transducer is connected to provide an input signal across the variable capacitor 14 or the variable resistor 13, respectively, in the circuit 10 described above to comprise an analog detector 10'. The digital output signal of the analog detector 10' illustrated in FIGURE 3 is precisely controlled to have a frequency $f_1$ by making the frequency of resonance of the crystal 15 in the circuit 10 equal to the frequency $f_1$. This means that the time interval between the positive-going slopes in the digital output signal would be constant, whereas the negative-going slope would be determined by the phenomenon sensed by the resistive transducer or the capacitive transducer.

As is further shown in FIGURE 3 a clock-signal generator comprising the clock signal generator circuit 20 is employed to generate a system clock signal of a frequency equal to, for example, 100 times the frequency $f_1$. This may be accomplished by inserting in the circuit 20 the crystals 25 and 26 each having a resonant frequency equal to 100 times the frequency $f_1$. The output signal of the analog detector 10' and the system clock 20 are gated together in an AND gate 40, which passes system clock pulses so long as the digital output signal of the analog detector is in its high state. Thus, when the resistance value of the resistor 13 or the capacitance value of the capacitor 14 varies in response to the phenomenon measured, the duty cycle of the detector 10' varies. This alters the length of the pulse controlling the counter circuit 50 so that more or less clock pulses are counted.

It is to be understood that the above described arrangements are illustrative of the application of the principles of the invention. Numerous other arrangements may be devised by those skilled in the art without departing from the spirit and scope of the invention. Thus, by way of example and not of limitation, the capacitance or resistance measuring system illustrated in FIGURE 3 may be used to control the quality of capacitors or resistors employed in any apparatus employing such devices. The measuring system may be used to precisely compute by simple means the variation of a capacitance value or resistance value from a known standard.

Moreover, while the coupling circuit has been described as being entirely independent in operation, a bank of such circuits could be frequency-locked together by supplying each circuit with a small amount of energy from a master control source. Such an amount of energy could be inserted, for example, at either side of the crystal. This frequency-locking would prevent minor inherent frequency variations in each of the circuit components from causing the circuits to run out of synchronization with each other.

Still further, the clock-signal generator circuit 20 illustrated in FIGURE 2 may be used in a great number of computer applications as a precise clock-signal generator for providing an assymmetric clock signal. Symmetry of the system clock signal may be varied by changing the frequency ratio between the crystal 25 and the crystal 26. Specifically, a two-to-one frequency ratio or three-to-one duty cycle in the clock signal may be obtained, for example, by making the ratio of the frequency of the crystal 25 and the frequency of the crystal 26 two-to-one or three-to-one. Thus, if the resonant frequency of the crystal 25 was 7 megacycles and the resonant frequency of the crystal 26 was 21 megacycles, a system clock output signal would be generated by the circuit 20 having a frequency of 7 megacycles and a duty cycle of three-to-one.

What is claimed as new is:

1. Apparatus for measuring capacitance comprising:

an analog detector for generating a digital output signal, said analog detector including a first and a second transistor each having an emitter, a base, and a collector electrode biased at a first, a second, and a third potential, respectively, said analog detector further including a piezoelectric crystal having a predetermined resonant frequency, said crystal interconnecting said collector electrode of said first transistor and said base electrode of said second transistor;

means for coupling a capacitor whose capacitance value is to be measured between said base electrode of said first transistor and said collector electrode of said second transistor, the capacitance value of said capacitor determining the duty cycle of said digital output signal;

a clock signal generator for generating an electrical clock signal of a predetermined frequency greater than said resonant frequency;

an AND gate responsive to the application of said electrical clock signal and said digital output signal for passing pulses of said clock signal when said digital output signal is at a predetermined level; and a counting circuit responsive to the signal passed by said AND gate circuit for producing an indication of the number of pulses passed by said AND gate circuit.

2. Apparatus for providing a signal as a function of the impedance of a circuit element, said apparatus comprising:

an analog detector means to which the circuit element is coupled, said analog detector means being operative in response to the impedance of the coupled circuit element for generating a bilevel output signal of a first preselected frequency having a duty cycle proportional to the impedance of the circuit element;

a clock signal generator for producing a bilevel clock signal of a second preselected frequency greater than first said preselected frequency;

an AND gate responsive to the application of said bilevel output signal and said bilevel clock signal for passing a resultant signal when said output signal is at a first level, said resultant signal corresponding to pulses of said clock signal; and a counting circuit for producing in response to the application of said resultant signal an indication of the number of pulses passed by said AND gate, said indication being proportional to the impedance of the circuit element.

3. Apparatus as described in claim 2 wherein said analog detector comprises a pair of transistors each having a base, an emitter, and a collector electrode, said pair of transistors being intercoupled to alternately switch from a conducting to a non-conducting state of operation, and said analog detector further including frequency controlling means employing a crystal, said frequency controlling means being interposed between the base electrode of a first transistor of said pair of transistors and the collector electrode of a second transistor of said pair of transistors for continuously driving said first transistor into conduction at a precisely determined repetition rate.

4. Apparatus as described in claim 2 wherein said clock signal generator comprises a free-running multivibrator circuit including a pair of transistors each having an emitter, a base, and a collector electrode, and a first piezoelectric crystal interconnecting the base electrode of a first transistor of said pair of transistors and the collector electrode of a second transistor of the pair of transistors, said multivibrator circuit further including a second piezoelectic crystal interconnecting the base electrode of said second transistor and the collector electrode of said first transistor, the frequency of said first piezoelectric crystal being equal to an integral multiple of the frequency of said second piezoelectric crystal.

References Cited

UNITED STATES PATENTS

| | | | |
|---|---|---|---|
| 3,042,911 | 7/1962 | Paradise et al. | 340—347 |
| 2,812,491 | 11/1957 | Figlio et al. | 324—65 XR |
| 3,015,477 | 1/1962 | Persson et al. | 324—65 |
| 3,125,708 | 3/1964 | Schutte | 331—65 XR |
| 2,601,491 | 6/1952 | Baker | 324—57 |
| 1,993,783 | 3/1935 | Heegner | 331—159 |
| 2,070,647 | 2/1937 | Baaten | 331—159 X |
| 2,575,759 | 11/1951 | Higinbutham et al. | 324—68 X |
| 2,851,596 | 9/1958 | Hilton. | |
| 3,086,170 | 4/1963 | Kemekhor et al. | 324—65 X |
| 3,238,453 | 3/1966 | Henry et al. | 324—61 |

OTHER REFERENCES

Buckner, German printed patent application No. 1,084,-756, Pub. July 7, 1960.

RUDOLPH V. ROLINEC, *Primary Examiner.*

E. E. KUBASIEWICZ, *Assistant Examiner.*

U.S. Cl. X.R.

331—113

PO-1050
(5/69)

UNITED STATES PATENT OFFICE
CERTIFICATE OF CORRECTION

Patent No. 3,434,051 Dated June 19, 1969

Inventor(s) Harry Robert Newhoff

It is certified that error appears in the above-identified patent and that said Letters Patent are hereby corrected as shown below:

In Column 1, line 20, "noncoductig" should be --nonconducting--

In Column 1, lines 26-27, after "predetermined" the following was omitted --frequency having a duty cycle determined--

In Column 2, line 5, "designating" should be --designing--

In Column 2, line 53, "analog-rontrolled" should be --analog-controlled--

SIGNED AND
SEALED
AUG 26 1969

(SEAL)
Attest:

Edward M. Fletcher, Jr.
Attesting Officer

WILLIAM E. SCHUYLER, JR.
Commissioner of Patents